US007153689B2

(12) United States Patent
Tolosko et al.

(10) Patent No.: US 7,153,689 B2
(45) Date of Patent: Dec. 26, 2006

(54) APPARATUS AND METHODS FOR CLEANING AND PRIMING DROPLET DISPENSING DEVICES

(75) Inventors: Brent T. Tolosko, Santa Clara, CA (US); Allen C. Thompson, San Francisco, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 558 days.

(21) Appl. No.: 10/211,623

(22) Filed: Aug. 1, 2002

(65) Prior Publication Data

US 2004/0020515 A1 Feb. 5, 2004

(51) Int. Cl.
*G01N 35/02* (2006.01)

(52) U.S. Cl. ........................................ 436/49; 436/180

(58) Field of Classification Search ................ 436/180, 436/49

See application file for complete search history.

(56) References Cited

U.S. PATENT DOCUMENTS

| | | | | |
|---|---|---|---|---|
| 4,479,136 | A | 10/1984 | Lewis et al. | |
| 5,137,765 | A | 8/1992 | Farnsworth | |
| 5,184,147 | A | 2/1993 | MacLane et al. | |
| 5,266,222 | A | 11/1993 | Willis et al. | |
| 5,449,754 | A | 9/1995 | Nishioka | |
| 5,624,711 | A | 4/1997 | Sundberg et al. | |
| 6,183,059 | B1 | 2/2001 | Muhl et al. | |
| 6,224,187 | B1 | 5/2001 | Inten et al. | |
| 6,242,266 | B1 * | 6/2001 | Schleifer et al. | 436/518 |
| 6,281,909 | B1 | 8/2001 | Fassier et al. | |
| 6,323,043 | B1 * | 11/2001 | Caren et al. | 436/518 |
| 6,341,843 | B1 | 1/2002 | Takemura et al. | |
| 6,347,858 | B1 | 2/2002 | Faisst, Jr. et al. | |
| 6,382,767 | B1 | 5/2002 | Greive | |
| 2001/0051334 | A1 * | 12/2001 | Barth et al. | 435/6 |

FOREIGN PATENT DOCUMENTS

| | | |
|---|---|---|
| WO | WO98/41531 | 9/1998 |

* cited by examiner

*Primary Examiner*—Jill Warden
*Assistant Examiner*—Natalia Levkovich

(57) ABSTRACT

Apparatus and methods are disclosed for cleaning and priming a droplet dispensing device having a plurality of nozzles aligned in at least one row. A dispensing surface of the dispensing device comprising the nozzles is sealingly engaged to form a chamber adjacent the dispensing surface. A wash fluid is introduced into the chamber and removed from the chamber. A priming vacuum is applied individually, and preferably, simultaneously, to at least a portion of the plurality of the nozzles. Optionally, a wash fluid is subsequently introduced into the chamber and removed from the chamber to rinse the dispensing surface.

17 Claims, 4 Drawing Sheets

APPARATUS AND METHODS FOR CLEANING AND PRIMING DROPLET DISPENSING DEVICES

BACKGROUND OF THE INVENTION

This invention relates to the cleaning and priming of droplet dispensing devices used in the manufacture of substrates or supports having bound to the surfaces thereof a plurality of chemical compounds, such as biopolymers. In one aspect the invention relates to the manufacture of arrays formed and arranged by depositing compounds or synthesizing large numbers of compounds on solid substrates in a predetermined arrangement. In another aspect this invention relates to the field of bioscience in which arrays of oligonucleotide probes are fabricated or deposited on a surface and are used to identify or analyze DNA sequences in cell matter.

In the field of diagnostics and therapeutics, it is often useful to attach species to a surface. One important application is in solid phase chemical synthesis wherein initial derivatization of a substrate surface enables synthesis of polymers such as oligonucleotides and peptides on the substrate itself. Substrate bound oligomer arrays, particularly oligonucleotide arrays, may be used in screening studies for determination of binding affinity. Modification of surfaces for use in chemical synthesis has been described. See, for example, U.S. Pat. No. 5,624,711 (Sundberg), U.S. Pat. No. 5,266,222 (Willis) and U.S. Pat. No. 5,137,765 (Farnsworth).

Determining the nucleotide sequences and expression levels of nucleic acids (DNA and RNA) is critical to understanding the function and control of genes and their relationship, for example, to disease discovery and disease management. Analysis of genetic information plays a crucial role in biological experimentation. This has become especially true with regard to studies directed at understanding the fundamental genetic and environmental factors associated with disease and the effects of potential therapeutic agents on the cell. Such a determination permits the early detection of infectious organisms such as bacteria, viruses, etc.; genetic diseases such as sickle cell anemia; and various cancers. This paradigm shift has lead to an increasing need within the life science industries for more sensitive, more accurate and higher-throughput technologies for performing analysis on genetic material obtained from a variety of biological sources.

Unique or misexpressed nucleotide sequences in a polynucleotide can be detected by hybridization with a nucleotide multimer, or oligonucleotide, probe. Hybridization is based on complementary base pairing. When complementary single stranded nucleic acids are incubated together, the complementary base sequences pair to form double stranded hybrid molecules. These techniques rely upon the inherent ability of nucleic acids to form duplexes via hydrogen bonding according to Watson-Crick base-pairing rules. The ability of single stranded deoxyribonucleic acid (ssDNA) or ribonucleic acid (RNA) to form a hydrogen bonded structure with a complementary nucleic acid sequence has been employed as an analytical tool in molecular biology research. An oligonucleotide probe employed in the detection is selected with a nucleotide sequence complementary, usually exactly complementary, to the nucleotide sequence in the target nucleic acid. Following hybridization of the probe with the target nucleic acid, any oligonucleotide probe/nucleic acid hybrids that have formed are typically separated from unhybridized probe. The amount of oligonucleotide probe in either of the two separated media is then tested to provide a qualitative or quantitative measurement of the amount of target nucleic acid originally present.

Direct detection of labeled target nucleic acid hybridized to surface-bound polynucleotide probes is particularly advantageous if the surface contains a mosaic of different probes that are individually localized to discrete, and often known, areas of the surface. Such ordered arrays containing a large number of oligonucleotide probes have been developed as tools for high throughput analyses of genotype and gene expression. Oligonucleotides synthesized on a solid substrate recognize uniquely complementary nucleic acids by hybridization, and arrays can be designed to define specific target sequences, analyze gene expression patterns or identify specific allelic variations. The arrays may be used for conducting cell study, diagnosing disease, identifying gene expression, monitoring drug response, determination of viral load, identifying genetic polymorphisms, analyzing gene expression patterns or identifying specific allelic variations, and the like.

In one approach, cell matter is lysed, to release its DNA as fragments, which are then separated out by electrophoresis or other means, and then tagged with a fluorescent or other label. The resulting DNA mix is exposed to an array of oligonucleotide probes, whereupon selective binding to matching probe sites takes place. The array is then washed and interrogated to determine the extent of hybridization reactions. In one approach the array is imaged so as to reveal for analysis and interpretation the sites where binding has occurred. Arrays of different chemical compounds or moieties or probe species provide methods of highly parallel detection, and hence improved speed and efficiency, in assays. Assuming that the different sequence polynucleotides were correctly deposited in accordance with the predetermined configuration, then the observed binding is indicative of the presence and/or concentration of one or more polynucleotide components of the sample.

The arrays may be microarrays created on the surface of a substrate by in situ synthesis of biopolymers such as polynucleotides, polypeptides, polysaccharides, etc., and combinations thereof, or by deposition of molecules such as oligonucleotides, cDNA and so forth. In general, arrays are synthesized on a surface of a substrate or substrate by one of any number of synthetic techniques that are known in the art. In one approach, for example, the substrate may be one on which a single array of chemical compounds is synthesized. Alternatively, multiple arrays of chemical compounds may be synthesized on the substrate, which is then diced, i.e., cut, into individual assay devices, which are substrates that each comprise a single array, or in some instances multiple arrays, on a surface of the substrate.

The in situ synthesis methods include those described in U.S. Pat. No. 5,449,754 for synthesizing peptide arrays, as well as WO 98/41531 and the references cited therein for synthesizing polynucleotides (specifically, DNA). Such in situ synthesis methods can be basically regarded as repeating at each spot the sequence of: (a) deprotecting any previously deposited monomer so that it can now link with a subsequently deposited protected monomer; and (b) depositing a droplet of another protected monomer for linking. Different monomers may be deposited at different regions on the substrate during any one iteration so that the different regions of the completed array will have different desired biopolymer sequences. One or more intermediate further steps may be required in each iteration, such as oxidation, capping and washing steps. The deposition methods basically involve depositing biopolymers at predetermined locations on a substrate, which are suitably activated such that the biopolymers can link thereto. Biopolymers of different sequence may be deposited at different regions of the substrate to yield the completed array. Washing or other additional steps may also be used. Reagents used in typical in situ synthesis are water sensitive, and thus the presence of moisture should be eliminated or at least minimized.

There are several important design aspects required to fabricate an array of biopolymers such as cDNA's or DNA oligomers. First, the array sensitivity is dependent on having reproducible spots on the substrate. The location of each type of spot must be known and the spotted area should be uniformly coated with the DNA. Second, since DNA is expensive to produce, a minimum amount of the DNA solution should be loaded into any of the transfer mechanisms. Third, any cross contamination of different DNA's must be lower than the sensitivity of the final array as used in a particular assay, to prevent false positive signals. Therefore, the transfer device must be easily cleaned after each type of DNA is deposited or the device must be inexpensive enough to be a disposable. Finally, since the quantity of the assay sample is often limited, it is advantageous to make the spots small and closely spaced.

Similar technologies can be used for in situ synthesis of biopolymer arrays, such as DNA oligomer arrays, on a solid substrate. In this case, each oligomer is formed nucleotide by nucleotide directly in the desired location on the substrate surface. This process demands repeatable drop size and accurate placement on the substrate. It is advantageous to have an easily cleaned deposition system since some of the reagents have a limited lifetime and must be purged from the system frequently. Since reagents, such as those used in conventional phosphoramidite DNA chemistry may be water sensitive, there is an additional limitation that these chemical reagents do not come in contact with water or water vapor. Therefore, the system must isolate the reagents from any air that may contain water vapor for hours to days during array fabrication. Additionally, the materials selected to construct system must be compatible with the chemical reagents thereby eliminating a lot of organic materials such as rubber.

In situ syntheses of the type described above generally utilize a reaction chamber having a controlled environment in the reaction chamber. For example, many syntheses require an anhydrous environment to avoid the destructive effects of exposing chemical reagents to humidity present in the ambient atmosphere. Typically, an anhydrous chamber is created by placing the device for dispensing reagents in a reaction chamber through which dry gas is purged. The controlled environment is maintained within the reaction chamber especially during the insertion and removal of devices into and out of the reaction chamber.

In one approach to the synthesis of microarrays, an apparatus is employed that comprises a reaction chamber and a device for dispensing reagents to the surface of a substrate at discrete sites. A positioning system, which may be a robotic manipulator, moves the substrate to the chamber, in which at least a portion of the device for dispensing reagents is housed. Alternatively, the device for dispensing reagents may be moved in and out of the chamber. A controller controls the application of the reagents to the substrate according to predetermined procedures. The positioning system may comprise one or more stages for moving the substrate to various positions for the dispensing of reagents thereon. The stages may be, for example, an x,y-motor-driven stage, a theta stage, a rotational motor-driven stage, and the like.

As indicated above, one of the steps in the synthesis process usually involves depositing small volumes of liquid containing reagents for the synthesis, for example, monomeric subunits or whole polynucleotides, onto to surface of a support or substrate. In one approach, pulse-jet techniques are employed in depositing small volumes of liquid for synthesis of chemical compounds on the surface of substrates. For example, arrays may be fabricated by depositing droplets from a pulse-jet in accordance with known techniques. The pulse-jet includes piezo or thermal jets. Given the above requirements of biopolymer array fabrication, deposition using pulse-jet techniques is particularly favorable. In particular, pulse-jet deposition has advantages that include producing very small spot sizes. This allows high-density arrays to be fabricated. Furthermore, the spot size is uniform and reproducible. Since it is a non-contact technique, pulse-jet deposition does not result in scratching or damaging the surface of the support on which the arrays are synthesized. Pulse-jet techniques have very high deposition rate, which facilitates rapid manufacture of arrays.

However, a pulse jet deposition system used for fabricating a biopolymer array, should meet a number of requirements. Specifically, the pulse jet head must be capable of being loaded with very small volumes of DNA solution. The system should provide for easy purging of the working solution and cleaning and priming of the pulse jet nozzles. When used for in situ synthesis, the system should be able to keep reagents isolated from moisture in the surrounding air.

During the deposition process in the use of pulse-jet heads for production of arrays of biopolymers, failures of one or more nozzles occur. These failures are often manifested as missing drops or excessive trajectory errors. To fix these failures the deposition nozzles must be cleaned and primed. Currently, this is accomplished manually by opening the deposition chamber and hand priming the heads with vacuum applied through tubing. As a result the deposition heads are exposed to humid atmospheric air and to uncontrolled forces from the manual application of the tubing. After the priming process, excess fluid must be removed. This is accomplished by wiping the heads, which subjects the deposition heads to further uncontrolled forces and potential mechanical damage from the wiping medium.

There is a need, therefore, for an apparatus and process that would permit automated cleaning and priming of dispensing nozzles that are part of droplet dispensing devices used in deposition techniques for the production of arrays of biopolymers. The cleaning should be carried out without mechanical contact with critical areas of the nozzle heads so that damage to the nozzle heads is avoided. The apparatus should provide for reduction or elimination of trajectory errors and/or drop dispensing errors so as to minimize deposition errors that might occur in the preparation of the arrays of biopolymers.

SUMMARY OF THE INVENTION

One embodiment of present invention is a method for cleaning and priming a droplet dispensing device having a plurality of nozzles aligned in at least one row. A dispensing surface of the dispensing device comprising the nozzles is sealingly engaged to form a chamber adjacent the dispensing surface. In one embodiment the chamber is formed below the dispensing surface. A wash fluid is introduced into the chamber and removed from the chamber, preferably simultaneously. In one approach, a wash fluid is introduced into the chamber in a direction that is substantially perpendicular to the dispensing surface and removed from the chamber in a direction that is substantially perpendicular to the dispensing surface. A priming vacuum is applied individually and preferably simultaneously to at least a portion of the plurality of the nozzles. Optionally, a rinse fluid is subsequently introduced into the chamber and removed from the chamber preferably simultaneously. In one approach a rinse fluid is subsequently introduced into the chamber in a direction that is substantially perpendicular to said dispensing surface and removed from the chamber in a direction that is substantially perpendicular to said dispensing surface.

Another embodiment of present invention is a method for cleaning and priming a droplet dispensing device having a plurality of nozzles aligned in at least one row. A dispensing surface of the dispensing device comprising the nozzles is sealingly engaged to form a chamber below the dispensing surface. A wash fluid is introduced into the chamber from the periphery of the chamber and removed from the center of the chamber. A priming vacuum is applied individually and preferably simultaneously to at least a portion of the plurality of the nozzles. Optionally, a wash fluid is subsequently introduced into the chamber from the periphery of the chamber and removed from the center of the chamber.

Another embodiment of the present invention is a method for cleaning and priming a droplet dispensing device having a plurality of nozzles aligned in at least one row. A dispensing surface of the droplet dispensing device comprising the nozzles is sealingly engaged to form a chamber below the dispensing surface. A chamber vacuum is applied to the chamber. A wash fluid is introduced into the chamber under conditions wherein the intensity of the chamber vacuum is adjusted so that it is sufficient to remove the wash fluid from the chamber. In one approach a chamber vacuum is applied to the chamber in a direction that is substantially perpendicular to the dispensing surface; and a wash fluid is introduced into the chamber in a direction that is substantially perpendicular to the dispensing surface under conditions wherein the chamber vacuum is sufficient to remove the wash fluid from the chamber. Next, a priming vacuum is applied simultaneously and individually to each of the plurality of the nozzles. A rinse fluid is introduced into the chamber in a direction that is substantially perpendicular to the dispensing surface wherein the chamber vacuum is sufficient to remove the rinse fluid from the chamber. The nozzles and the dispensing surface, optionally, are dried. The chamber vacuum may be adjusted to an intensity sufficient to accomplish this drying procedure.

Another embodiment of the present invention is a method for cleaning and priming a droplet dispensing device having a plurality of nozzles aligned in at least one row. A dispensing surface of the droplet dispensing device comprising the nozzles is sealingly engaged to form a chamber below the dispensing surface. A chamber vacuum is applied to the chamber approximately from its the center. A wash fluid is introduced into the chamber from the periphery of the chamber under conditions wherein the intensity of the chamber vacuum is sufficient to remove the wash fluid from the chamber. Next, a priming vacuum is applied simultaneously and individually to each of the plurality of the nozzles. The intensity of the chamber vacuum is adjusted and a rinse fluid is introduced into the chamber from the periphery of the chamber wherein the chamber vacuum is sufficient to remove the rinse fluid from the chamber. Then, the intensity of the chamber vacuum is adjusted to an intensity sufficient to dry the nozzles and the dispensing surface.

Another embodiment of the present invention is an apparatus for cleaning and priming a droplet dispensing device where the device comprises a plurality of nozzles aligned in at least one row. The apparatus comprises means for sealingly engaging a dispensing surface of the droplet dispensing device comprising the nozzles to form a chamber adjacent the dispensing surface, means for introducing a wash fluid into the chamber and removing, preferably simultaneously, the wash fluid from the chamber, and means for applying a priming vacuum individually, and preferably simultaneously, to at least a portion of the plurality of the nozzles. In one approach the means for introducing a wash fluid into the chamber does so in a direction that is substantially perpendicular to the dispensing surface and the wash fluid is removed from the chamber in a direction that is substantially perpendicular to the dispensing surface.

Another embodiment of the present invention is an apparatus for cleaning and priming a droplet dispensing device where the device comprises a plurality of nozzles aligned in at least one row. The apparatus comprises means for sealingly engaging a dispensing surface of the droplet dispensing device comprising the nozzles to form a chamber below the dispensing surface, means for introducing a wash fluid into the chamber from the periphery of the chamber and removing, preferably simultaneously, the wash fluid from the center of the chamber, and means for applying a priming vacuum individually, and preferably simultaneously, to at least a portion of the plurality of the nozzles.

Another embodiment of the present invention is an apparatus for cleaning and priming a droplet dispensing device having a plurality of nozzles aligned in at least one row. The apparatus comprises a housing having a top portion, at least one wash vacuum channel in the housing, the wash vacuum channel being adapted to provide for communication between a top portion of the housing and a wash vacuum source, a plurality of priming channels in the housing disposed in parallel rows on opposite sides of the at least one wash vacuum channel and adapted to provide communication between the top portion and a priming vacuum source, fluid channels in the housing disposed on opposite sides of the plurality of priming channels and adapted to provide communication between the top portion and a vent and/or a source of a fluid, and a sealing member surrounding an outer surface of the housing adjacent the top portion.

Another embodiment of the present invention is an apparatus for synthesizing a plurality of biopolymer features on the surface of a substrate. The apparatus comprises a reaction chamber, a droplet dispensing device for dispensing reagents for synthesizing biopolymers on a surface of the substrate, a cleaning and priming station for cleaning and priming the dispensing device, the cleaning and priming station comprising an apparatus as described above, and a mechanism for moving the dispensing device and/or the cleaning and priming station relative to one another. Preferably, the elements of the above apparatus are under computer control. The apparatus may optionally include a mechanism for moving a substrate to and from the reaction chamber and a controller for controlling the movement of the mechanism.

Another embodiment of the present inventions is a method for synthesizing an array of biopolymers on a surface of a substrate. The method comprises multiple rounds of subunit additions wherein one or more polymer subunits are added at each of multiple feature locations on the surface to form one or more arrays on the surface. Each round of subunit additions comprises bringing the substrate and a dispensing system for dispensing the polymer subunits for the synthesis of the biopolymers into a dispensing position relative to the activated discrete sites on the surface, dispensing the polymer subunits to the discrete sites, removing the substrate and/or the dispensing system from the relative dispensing position, moving the dispensing system into contact with an apparatus as described above, cleaning and priming the dispensing system, and repeating the above steps sufficient to produce the desired array.

Another embodiment of the present invention is a method for cleaning a droplet dispensing device employed in the fabrication of microarrays. The method comprises cleaning a droplet dispensing surface of the device in an enclosed environment in which the microarrays are fabricated.

Another embodiment of the present invention is a method for priming a droplet dispensing device employed in the fabrication of microarrays. The method comprises priming a droplet dispensing surface of the device in an enclosed environment in which the microarrays are fabricated.

DETAILED DESCRIPTION OF THE INVENTION

Figure 1:
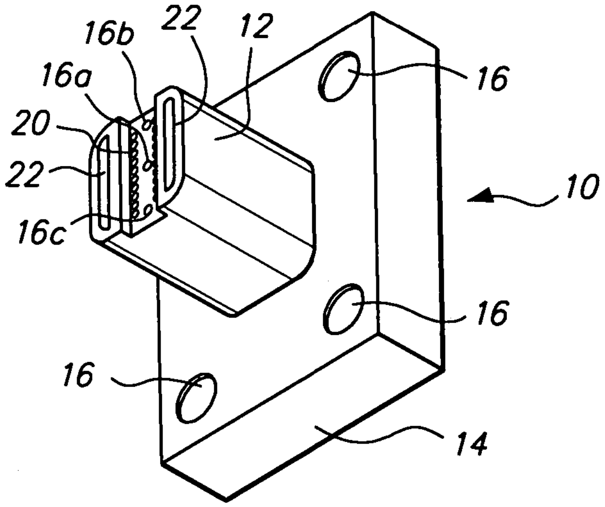
FIG. 1 is a perspective view of an apparatus in accordance with the present invention.
Figure 2:
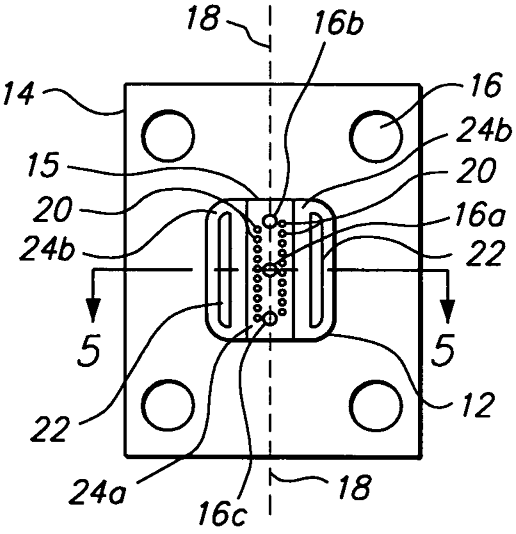
FIG. 2 is an alternate view of the apparatus of FIG. 1 taken from the top.
Figure 3:
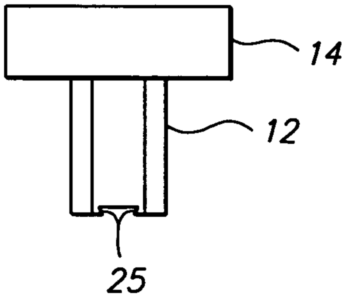
FIG. 3 is an alternate view of the apparatus of FIG. 1 taken from a side.
Figure 4:
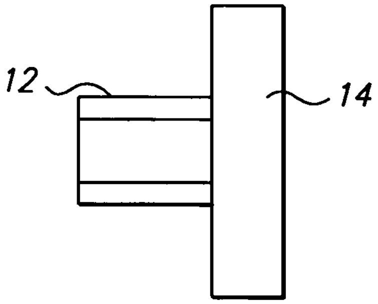
FIG. 4 is an alternate view of the apparatus of FIG. 1 taken from another side.
Figure 5:
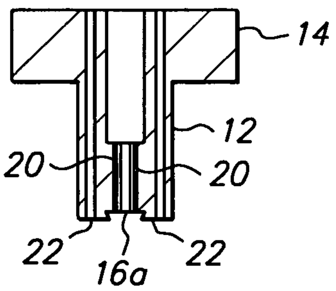
FIG. 5 is a cross-sectional view of the apparatus of FIG. 1 taken along line 5—5.

The present invention provides an automated apparatus for the priming and cleaning of droplet dispensing devices. The present invention eliminates the aforementioned manual process. The apparatus may be placed in the reaction chamber (sometimes referred to as the deposition chamber) so that dry inert gas atmosphere therein may be maintained. In this way, the reaction chamber provides for an enclosed environment in which droplet dispensing devices are used. An example of a reaction chamber, for purposes of illustration and not limitation, is disclosed in U.S. patent application Ser. No. 10/035,787 filed Dec. 24, 2001, entitled "Small Volume Chambers."

In one approach in accordance with the present invention, a controlled force is applied to the present apparatus to provide a seal with a surface of the droplet dispensing device and to form a cleaning chamber comprising the surface of the droplet dispensing device having the nozzles to be cleaned and primed (referred to herein as a dispensing surface). The dispensing surface may also be referred to as the front surface of the droplet dispensing device. The chamber is formed adjacent to the dispensing surface such that the dispensing surface is included as part of the cleaning chamber. Usually, the cleaning chamber is formed below the dispensing surface although other configurations are possible consistent with the principles of the present invention. The present apparatus cleans the nozzles without mechanical contact to the nozzle area, which is critical to the correct deposition of drops of liquid to the surface of a support. The cleaning process is achieved using one or more fluids, which contact the nozzles of the droplet dispensing device. The fluids may be liquids, gases or combinations thereof. The process is particularly applicable to the cleaning of nozzles necessitated by trajectory errors that occur due to accumulation of reagents at the nozzle exit.

To further assist in the overall process, the present apparatus can be moved into a priming position under a controlled force. The priming process is improved in the present invention by using an array of individual vacuum sources and applying them to the nozzles simultaneously. This is advantageous because it avoids creating a large pool of liquid under the nozzles that must later be removed. This advantage is achieved because fluid is drawn only in small areas close to the size of the orifices of each nozzle. Two effects minimize residue in these areas. The first effect involves capture of residue by vacuum as the array of priming sources is retracted. The second effect involves withdrawal of residue into the nozzle by the normal negative pressure held at the nozzles of the droplet dispensing device.

Another feature that may be employed in one embodiment of the present invention is a group of orifices in the form of tubular passages that extend from a central priming vacuum plenum to the individual priming ports. These tubular passages implement a form of adaptive control in the primer. Nozzles that have been primed fill these passages with liquid creating a higher pressure drop across the passage and than at the nozzle. The overall result is a concentration of the vacuum at unprimed nozzles.

In one embodiment the apparatus of the present invention comprises means for sealingly engaging a dispensing surface of the droplet dispensing device, which comprises a plurality of nozzles aligned in at least one row, to form below the dispensing surface a cleaning and priming chamber incorporating the nozzles. The nozzles may be aligned in at least two rows, at least three rows, at least four rows, and so forth. Usually, the maximum number of rows is about 14. Preferably, the number of rows of nozzles is about 4 to about 8.

In one approach sealing engagement is achieved by means of an elastomeric member, which contacts the dispensing surface and surrounds the perimeter of the area of the dispensing surface comprising the nozzles. The elastomeric material of the elastomeric member should be compatible with, and preferably inert to, the types of fluids that are employed in the cleaning process. Accordingly, the nature of the elastomeric material should be such that it is not degradable by or reactive with such fluids at least to the extent that the seal that is formed is compromised. The seal should be sufficient to minimize or avoid any fluid escaping from the chamber through the seal. Suitable elastomeric materials include fluorocarbon or perfluoroelastomer rubber, and the like. In one embodiment the elastomeric material surrounds the perimeter of the present apparatus at the area of the apparatus (chamber-forming area) that forms part of the chamber upon engagement of the elastomeric material with the dispensing surface. Other means for achieving the desired sealing engagement of the present apparatus and the dispensing surface include, for example, configuring the primer and setting fluid pressure and vacuum levels such that the perimeter of the primers wetted area is always uniformly below atmospheric pressure. This would insure that fluid would not escape from the primer into the reaction chamber. In this embodiment the primer is completely non-contacting. If desired, the peripheral lip of the elastomeric material, i.e., the portion of the elastomeric material that contacts the dispensing surface, may be modified to provide for an improved seal. For example, one or more features such as continuous ridges and the like can be incorporated into the lip.

The apparatus of the invention may also comprise a biasing member. The biasing member is usually located below the elastomeric member and provides additional assistance in forming the sealed cleaning and priming chamber. Usually, the biasing member is located on the perimeter of the main body of a housing of the present apparatus between the elastomeric member and a base plate on which the main body is mounted or is an integral part thereof. In the aforementioned embodiment the main body and the base plate comprise the housing of the present apparatus. The biasing member may be a spring, elastomeric material, which may or may not differ from that of the elastomeric member. If the same material is employed, the material may differ, for example, by having a different durometer hardness or cross section, and the like.

The present apparatus may be permanently affixed within the reaction chamber. On the other hand, the present apparatus may be positioned outside of the reaction chamber and moved into the reaction chamber for cleaning and priming of the droplet dispensing device. In this embodiment, which is preferred, the housing of the reaction chamber is generally constructed to permit access into the reaction chamber. In one approach, the reaction chamber has an opening that is sealable to fluid transfer after the present apparatus is moved therein. Such seals may comprise a flexible material that is sufficiently flexible or compressible to form a fluid tight seal that can be maintained under increased pressures encountered in the use of the device. The flexible member may be, for example, rubber, flexible plastic, flexible resins, and the like and combinations thereof. In any event the flexible material should be substantially inert with respect to the fluids introduced into the device and must not interfere with the reactions that occur within the device. The flexible member is usually a gasket and may be in any shape such as, for example, circular, oval, rectangular, and the like. Preferably, the flexible member is in the form of an O-ring.

When the apparatus of the invention is located outside of the reaction chamber, the present apparatus is transported to and from the reaction chamber by a transfer element such as a robotic arm, and so forth. In one embodiment a transfer robot is mounted on the main platform of an apparatus for carrying out the syntheses on the surfaces of the supports. The transfer robot may comprise a base and an arm that is movably mounted on the base. The present apparatus may be mounted on the arm by any suitable means. In use, the transfer robot is activated and the arm of the robot is moved so that the present apparatus is delivered to a predetermined location in the reaction chamber.

The droplet dispensing device is moved within the reaction chamber to a position such that the dispensing surface of the dispensing device that has the nozzles that are to be cleaned and primed is disposed over the chamber-forming area of the present apparatus. Usually, the dispensing surface is oriented in a downward direction and the elastomeric member and the chamber-forming area of the present apparatus is urged upwardly in different positions with respect to the dispensing surface, and in a controlled fashion, to engage the dispensing surface.

As mentioned above, the present apparatus is urged into contact with the dispensing surface. The amount of force applied to achieve sealing engagement should be minimized to minimize or avoid upsetting the alignment of the nozzles of the dispensing device. The present apparatus is adapted to so that the force applied to achieve sealing engagement is about 0.05 to about 2.0 lbf, usually, about 0.1 to about 0.4 lbf. The force is applied by means of, for example, a pneumatic directional valve with or without a proportional pressure regulating valve, a press, motor-driven screw, clamp, or linear electrical actuator like a solenoid or linear motor with or without positional feedback, and so forth. The amount of pneumatic pressure applied to the actuator is an important feature in controlling the movement and positioning of the present apparatus. The main reaction to this force is provided by spring 71, which is independent of the elastomer seal and its biasing spring. This gives a good pressure control range while at the same time limiting the force applied to the deposition head by the elastomer seal.

The present apparatus also comprises means for introducing a wash fluid into the cleaning and priming chamber and removing the wash fluid from the cleaning and priming chamber. In one approach wash fluid is introduced into the chamber, and removed from the chamber, in a direction that is substantially perpendicular to the dispensing surface of the droplet dispensing device. By “substantially perpendicular” is meant that the angle formed by the direction of the introduction or the direction of removal is within about 0 to about 30 degrees, preferably 0 degrees from the perpendicular. In another approach wash fluid is introduced into the chamber from the periphery of the chamber and removed from the chamber from approximately the center of the chamber.

Wash fluid is generally introduced into the cleaning and priming chamber by means of, for example, one or more wash fluid channels or passageways that extend through a main body of the present apparatus and that exit at openings at the chamber-forming area of the main body. In one approach the wash fluid channels may be located at or near the periphery of the main body of the present apparatus. The wash fluid channels may be narrow bores, cylindrical bores, rectangular bores or approximately rectangular bores, or have a more complex geometry to guide fluid flow, and so forth. The dimensions of the wash fluid channels are dependent on the dimensions and configuration of the deposition head to be primed/cleaned. Fluid and gas flowrates, the desired operating pressure within the priming chamber, and so forth. Usually, the dimensions of the wash fluid channels are about 0.1 to about 1 mm, more usually about 0.4 to about 0.6 mm, in width by a length that is slightly (about 10% to about 20%) longer than the row of deposition nozzles. The number of such channels is dependent on the dimensions of the channels, the number of rows of nozzles in the deposition head, and the like, and is usually about 1 to about 12.

The wash fluid channels are connected by suitable valves to alternate between a source of wash or rinse fluid and a vent. The valves are computer controlled and are opened to the source of wash or rinse fluid or to the vent consistent with carrying out the present methods. Examples of such valves include pneumatic directional valves, solenoid operated poppet or diaphragm valves, and the like. The wash or rinse fluid may be contained in a suitable reservoir that is in fluid communication with the passageways. The valves may also include pressure regulator valves for introducing an inert gas such as, for example, dry nitrogen, along with the wash fluid or as part of the venting process. The source of inert gas for the venting process is usually to the interior of the reaction chamber, which is normally an ambient atmosphere of inert gas.

Fluid is removed from the interior of the cleaning and priming chamber by applying a vacuum to the chamber, which may be referred to herein as a chamber vacuum or a fluid removal vacuum. In another approach fluid is removed in a direction that is substantially perpendicular to the dispensing surface. To this end, the main body of the present apparatus has one or more, usually about 1 to about 36, wash vacuum channels or passageways. The number of passageways is determined by optimizing fluid removal and additionally by the number of rows of nozzles. The magnitude of the vacuum should be sufficient to remove the wash or rinse fluid that is introduced into the cleaning and priming chamber. Usually, the vacuum is about 0.5 to about 20 inches Hg. The magnitude or intensity of the fluid removal vacuum in the chamber may be varied by adjusting the level of the vacuum source and the vent level. In one approach suitable valves may be employed for applying the vacuum and for venting the chamber. The intensity of the fluid removal vacuum or chamber vacuum may be adjusted upwardly by partially or fully closing a valve to a vent and partially or fully opening a valve to a vacuum source. Alternatively, the intensity of the fluid removal vacuum may be reduced by partially or fully opening a vent valve and partially or fully closing a valve to a vacuum source. Thus, the intensity of the chamber vacuum is adjusted during the present methods depending on the particular step of the cleaning and priming process.

In one approach, the fluid is removed from approximately the center of the chamber. This approach is generally used when the dispensing device comprises more than one row of dispensing nozzles, but need not. In this approach the main body of the present apparatus has one or more wash vacuum channels or passageways located at, or approximately at, the center of the main body. When the present apparatus comprises more than one wash vacuum passageway, the passageways are located along, or approximate, a center line, centralized circular line, or the like depending on the geometry of the main body of the present apparatus. The phrase "approximately at the center" of the present apparatus means that the passageways are within about 5 mm of the center, usually, within about 3 mm of the center of the chamber forming area of the main body of the present apparatus. If there is only one row of dispensing nozzles in the droplet dispensing device, the priming passage may be in the center and the wash vacuum passage may be to one side.

The wash vacuum channels may be narrow bores, cylindrical bores, rectangular bores or approximately rectangular bores, or have a more complex geometry to guide fluid flow, and so forth. The dimensions of the wash vacuum channels are dependent on the number of such channels, the configuration of the deposition head to be primed/cleaned, fluid and gas flowrates, the desired pressure drop across the passages, the desired operating pressure within the priming chamber, and so forth. Usually, the dimensions of the wash vacuum channels are about 0.1 to about 1 mm, more usually about 0.4 to about 0.6 mm wide by a length slightly (about 1% to about 10%) longer than the row of deposition nozzles. The number of such channels is dependent on the number of rows of nozzles in the deposition head and is usually about 1 to about 4 per row. The wash vacuum passageways are in fluid communication with a suitable waste receptacle that is of a size sufficient to accommodate the removed wash fluid. The waste receptacle may be in fluid communication with a mechanism for emptying the waste receptacle from time to time as needed.

Preferably, the apparatus is adapted so that introduction and removal of wash fluid is carried out simultaneously. Usually, chamber vacuum or wash vacuum is applied and wash fluid is subsequently introduced so that removal of the wash fluid occurs substantially simultaneously by the application of the wash vacuum. The wash fluid flows through the chamber created as described above and then exits to a waste reservoir. After application of wash fluid is terminated, the chamber vacuum or wash vacuum is adjusted, as described above, to a level suitable for priming. This avoids creating a positive pressure in the chamber when the fluid is introduced, which can force wash fluid into the nozzles or out into the reaction chamber.

The present apparatus further comprises means for applying a priming vacuum individually to each of at least a portion of the plurality of the nozzles. Preferably, the apparatus is adapted so that the priming vacuum is applied simultaneously and individually to all of the at least a portion of the plurality of nozzles and usually to all of such nozzles. In one approach the priming vacuum is applied substantially perpendicular to the dispensing surface of the droplet dispenses device. Thus, in one embodiment the apparatus of the invention comprises a plurality of priming channels or passageways through the main body with openings at the chamber-forming area of the apparatus and each adapted to provide for individually priming a respective nozzle of the droplet dispensing device. The priming passageways are situated in the main body so that they are aligned with respective nozzles when the elastomeric member of the present apparatus is urged into contact with the dispensing surface of the droplet dispensing device.

In one embodiment a plurality of priming channels in the housing are disposed in parallel rows on opposite sides of the at least one wash vacuum channel and adapted to provide communication between the top portion of the main body, which comprises the chamber-forming area, and a priming vacuum source.

The dimensions of the priming channels are dependent to some extent on the dimensions of the nozzles. Typically, the width or diameter of the channels is at least the same as, and usually larger than, that of the nozzles. By slightly larger is meant that the width or diameter of the channels is about 2 to about 10 times greater than, usually, about 5 times greater than, the width or diameter of the nozzles. The length of the priming channels is usually dependent on the dimensions of the housing of the present apparatus. Furthermore, The pressure drop through the channel is also adjusted by its length, and so forth. Usually, the dimensions of the priming channels are about 2 to about 5 mm. The number of such channels is dependent on the number of nozzles to be primed and is usually about 5 to about 50. The priming passageways are in communication with a suitable vacuum source. Usually, the intensity of the priming vacuum is about 1 to about 40 inches Hg.

The dispensing surface of the droplet dispensing device is usually rinsed after the priming process. The rinsing procedure is carried out in a manner similar to the cleaning procedure discussed above by increasing the intensity of the chamber vacuum and applying the rinse fluid.

The dimensions of the apparatus of the invention are dependent on the dimensions of the reaction chamber, the droplet dispensing device, nozzle configuration, and so forth. Typically, the dimensions of the present apparatus are about 5 to about 15 mm in height by about 5 to about 5 mm in width and length, and in one embodiment, about 10 mm by 10 mm by 10 mm.

The surface of the main body of the housing of the present apparatus that comprises the chamber-forming area may be treated to adjust its surface properties such as, for example, its surface energy including, for instance, hydrophobicity, hydrophilicity, surface structure or finish and the like. To this end the surface may be treated by coating, padding or plating with a material that allows for a desired property, etching or mechanical finishing means such as bead blasting, sanding, brushing, and the like. For example, the surface may be coated with a hydrophobic material, a hydrophilic material, and the like. Suitable hydrophobic materials include plastics, silanized glass, fused silica, and so forth. In one embodiment the material is Teflon®. Suitable hydrophilic materials include polymers such as PEEK or polysulfone, matte finished metal, and so forth. The material may be in the form of a strip of material positioned on an upper surface of the main body of the apparatus of the invention. The material may be secured to the upper surface by means of adhesive, retaining elements, welding, molding or casting in place, and so forth. In general, the treatment should not interfere with the openings in the upper surface of the main body, which represent the ends of the various channels mentioned above. The surface may comprise features that assist in preventing pooling of fluid on the surface. Such features include by way of illustration and not limitation indentations, pockets, channels, bores, porosity, and the like in or on the surface.

An apparatus of the invention usually includes a means for moving the apparatus into engagement with the dispensing surface of a droplet dispensing device as well as incrementally moving the present apparatus to various positions of engagement with such surface. Such means for moving the apparatus include, for example, a motion stage, pneumatic cylinder, a press, motor driven screw, clamp, linear electrical actuator such as, e.g., a solenoid or linear motor with or without positional feedback and the like.

One embodiment of an apparatus in accordance with the present invention is depicted in FIGS. 1–5. Apparatus 10 comprises main body 12 and base plate 14, which normally are integral. Base plate 14 has bores 16 for securing apparatus 10 to, for example, a manifold block. Main body 12 has three wash vacuum channels 16*a*, 16*b* and 16*c*, which generally lie along centerline 18 and pass through main body 12 from top surface 15. A plurality of priming passageways 20, which generally correspond with a plurality of nozzles of a droplet dispensing device (not shown) lie in main body 12. Priming channels 20 are disposed on both sides of wash vacuum channels 16*a*, 16*b* and 16*c* in the view shown in FIG. 2. Apparatus 10 also comprises wash channels 22 disposed in main body 12. As can be seen, top surface 15 has two levels 24*a* and 24*b*. Level 24*a* lies below level 24*b* and comprises indentations 25. Level 24*a* of apparatus 10 is generally designed so that insert 26 (see FIGS. 6–7) is retained in top surface 15. Insert 26 is made of a material that provides for a different surface energy of top surface 15 at level 24*a* as compared to that of top surface 15 at level 24*b*. When insert 26 is seated in level 24*a*, surface 32 of insert 26 is above the level of the surfaces at level 24*b*. Usually, surface 32 extends above surface 15 at level 24*b* about 0 to about 0.5 mm, more usually, about 0.1 to about 0.2 mm.

Figure 6:
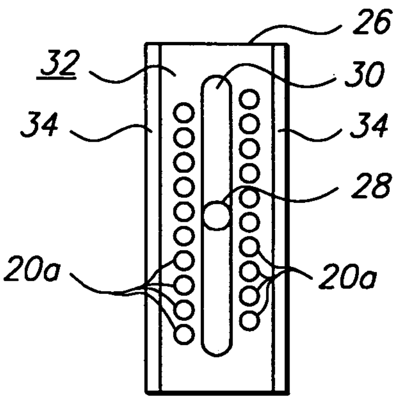
FIG. 6 is a perspective view taken from the front of an insert for a portion of a top surface of the apparatus of FIG. 1.
Figure 7:
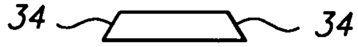
FIG. 7 is an alternate view of the insert of FIG. 6 taken from a side.
Figure 8:
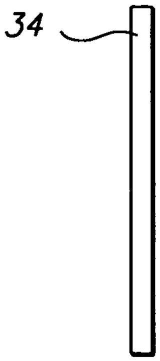
FIG. 8 is an alternate view of the insert of FIG. 6 taken from another side.

Referring to FIGS. 6–7, insert 26 comprises a central bore 28 in milled pocket 30. Central bore 28 extends through insert 26 while milled pocket 30 extends only partially into surface 32 of insert 26. Central bore 28 corresponds to wash vacuum channel 16*a*. In the embodiment shown, insert 26 has only one bore corresponding to a wash vacuum channel of apparatus 10, which effectively provides for only one wash vacuum channel when insert 26 is seated in top surface 15. Additional wash vacuum channels may be realized using additional bores in insert 26 that correspond to other wash vacuum channels in main body 12. Referring to FIGS. 6–7 insert 26 has slanted edges 34, which correspond in shape to indentations 25 of apparatus 10. Correspondence between slanted edges 34 and indentations 25 allow insert 26 to be firmly seated in level 24*a* of top surface 15 and retained therein. Insert 26 also has a plurality of bores 20*a* through insert 26, which correspond to priming passageways 20 of apparatus 10.

Figure 9:
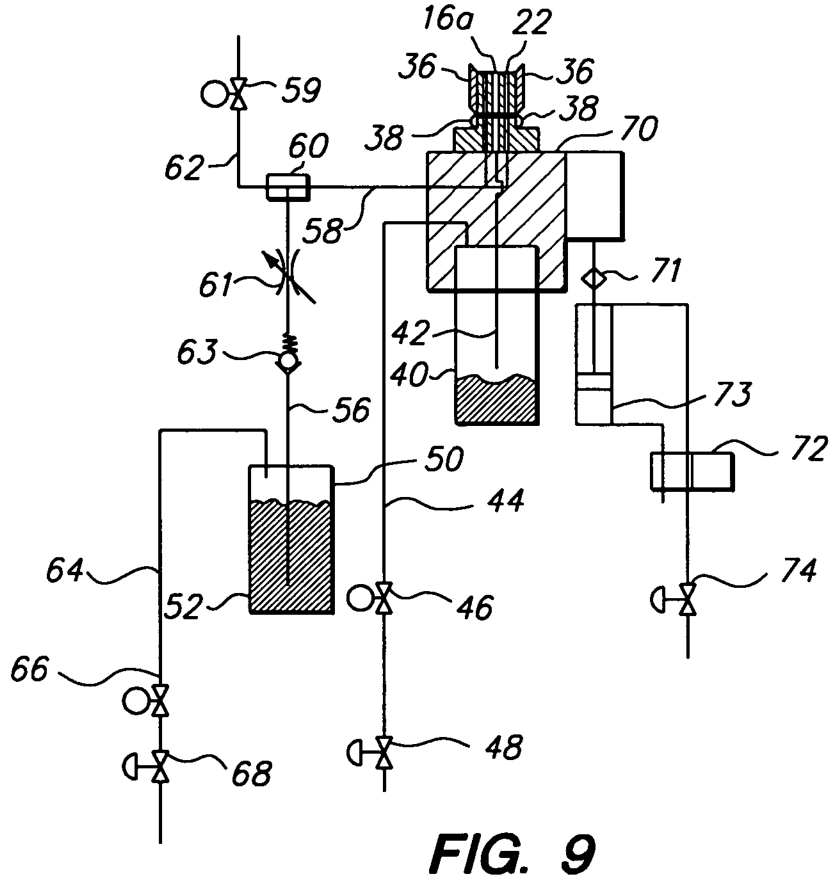
FIG. 9 is a schematic drawing of an apparatus of FIG. 1 mounted on a manifold.

Referring to FIG. 9 apparatus 10 is shown in cross-section with elastomeric member 36 surrounding an upper portion of main body 12. Biasing member 38 lies below elastomeric member 36 on main body 12. Wash vacuum channel 16*a* is in fluid communication with waste receptacle 40 by means of fluid line 42. A vacuum source (not shown) is in communication with waste receptacle 40 by means of line 44, which includes on-off valve 46 and proportional vacuum regulating valve 48. Receptacle 50 has wash fluid 52 contained therein and is in fluid communication with wash channels 22 by means of line 56 and line 58, which intersect at tee 60. Line 62 provides fluid communication with a source of inert gas (not shown) and wash channels 22. Line 62 comprises pneumatic directional valve 59 between the source of inert gas and tee 60. Disposed in line 58 are check valve 63 and flow control valve 61. Receptacle 50 is also in communication with a pressure source (not shown) by means of line 64, which also comprises pneumatic directional valve 66 for introduction of a rinse fluid and inert gas regulator valve 68, which provides for the source of pressure. Apparatus 10 is secured to manifold block 70, which is connected to pneumatic directional valve 72, guided pneumatic cylinder 73 and proportional pressure regulating valve 74. This embodiment is an example of providing for movement of apparatus 10 to and from engagement with, as well as incremental movement to various positions of engagement with, the dispensing surface of a droplet dispensing device. The combination of valve 72 guided pneumatic cylinder 73 and valve 74 provide a motion stage.

Figure 10A:
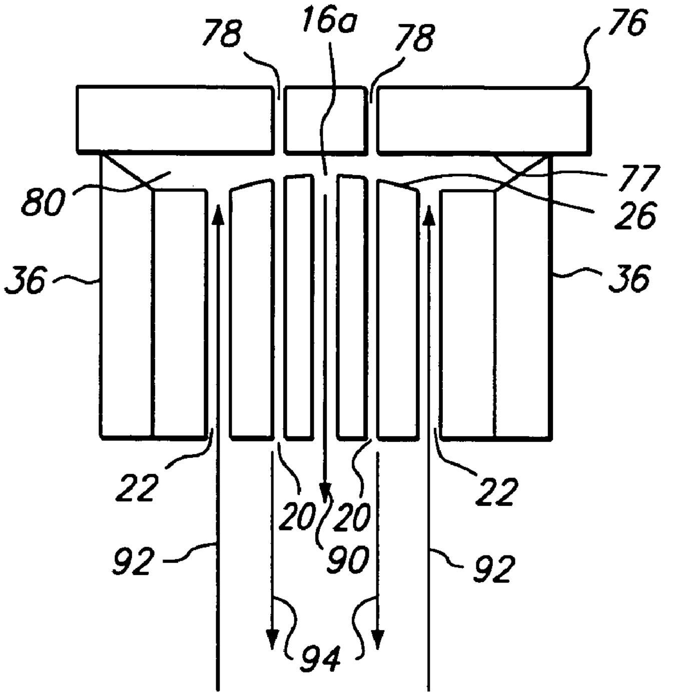
FIG. 10*a* is a partial sectional view of a portion of the apparatus of FIG. 1 in engagement with a dispensing surface of a droplet dispensing device in a washing position or a rinsing position.

Referring to FIG. 10*a*, apparatus 10 is depicted with elastomeric member 36 in engagement with dispensing surface 77 of droplet dispensing device 76, which comprises a plurality of nozzles 78. As can be seen, priming channels 20 are aligned with a respective nozzle 78. Engagement of elastomeric member 36 with dispensing surface 77 results in the formation of cleaning and priming chamber 80.

The operation of apparatus 10 is explained next with reference to FIGS. 10*a* and 10*b*. Elastomeric member 36 is brought into contact with dispensing surface 77 by actuation of pneumatic directional valve 72 and proportional pressure regulating valve 74 to form sealed chamber 80 in a cleaning or washing position (see FIG. 10*a*). In this position optimal cleaning of the nozzles and dispensing surface is realized. This means that dispensing surface 77 and top surface 15

(with insert 26 in place) of apparatus 10 are usually about 0.5 to about 3 mm apart, more usually, about 1 to about 2 mm apart. The washing position may be explained further as follows: The assembly is positioned to have solvent and gas, typically, inert gas, turbulently impinge on the dispensing surface of the dispensing device to dissolve and dislodge any accumulated deposition fluid residue.

Pneumatic directional valve 59 is activated open and on-off valve 46 is opened to provide fluid communication between a vacuum source and waste receptacle and proportional vacuum regulating valve 48. Vacuum direction is indicated by directional arrow 90. Approximately simultaneously, pneumatic directional valve 66 and pressure regulator 68 are activated to force wash fluid 52 through lines 56 and 58 and up through wash fluid channels 22. Pneumatic directional valve 59 permits a predetermined flow rate of inert gas, which is ambient to a reaction chamber, to flow through line 62 and mix at tee 60 with wash fluid 52 to form a vent gas/wash fluid mixture. Wash fluid 52, having mixed with inert gas, enters chamber 80 and impinges on dispensing surface 77 and nozzles 78 to remove residual reagents. The direction of flow is indicated by directional arrows 92. This washing procedure is continued for a period sufficient to achieve cleaning of the dispensing surface and the nozzles so that errors such as trajectory errors are avoided. Usually, the period of time for cleaning is about 0.5 to about 5.0 seconds. The temperature of the wash fluid may be elevated to promote more efficient cleaning. The temperature is usually in the range of about 20 to about 40° C., more usually, about 20 to about 25° C.

The nature of the wash fluid is dependent on the nature of the reagents employed in the synthesis of the chemical compounds. The wash solution may be an organic solvent or mixtures thereof or an inorganic solvent or mixtures thereof or a combination of organic solvent and inorganic solvent. Examples of organic solvents include acetonitrile, alcohol, and the like. Examples of inorganic solvents include water, and the like.

Figure 10B:
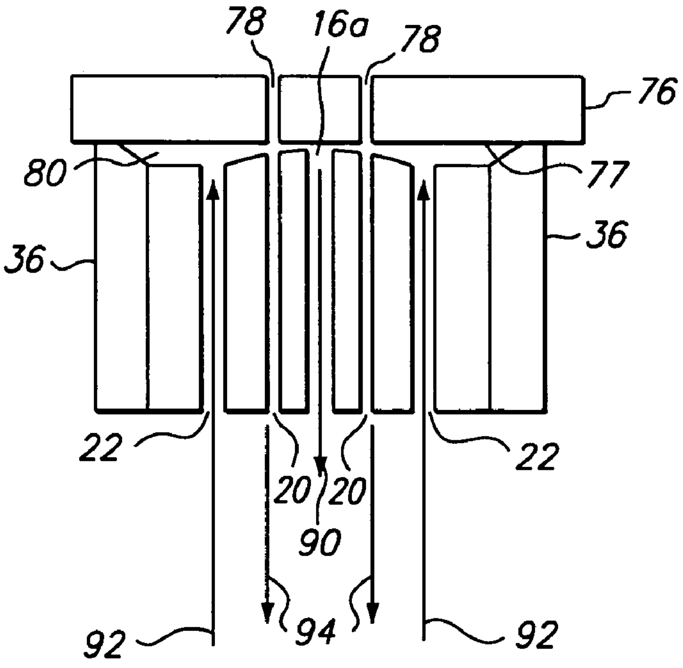
FIG. 10*b* is a partial sectional view of a portion of the apparatus of FIG. 1 in engagement with a dispensing surface of a droplet dispensing device in a priming position or rinse position

Valve 74 is again actuated to move apparatus 10 into a priming position (see FIG. 10*b*). The priming position allows optimal priming of nozzles 78. In this position optimal priming of the nozzles is realized without mechanical disruption of nozzles 78 of droplet dispensing device 76. This means that dispensing surface 77 and surface 32 of insert 26 are about 0.005 to about 0.2 mm apart, more usually, about 0.01 to about 0.05 mm apart. Priming is actuated as follows: Prime vacuum is established by controlling valve 48 and closing vent valve 59. Vacuum is applied to the nozzles, drawing deposition fluid through them. The small gap between the dispensing surface comprising the nozzles and the primer allows sufficient vacuum to be applied to the nozzles. Pressure within the dispensing device may also be independently increased to assist this process. The size and position of the vacuum sources with respect to the dispensing nozzles is determined to provide suitable priming vacuum and efficiently collect the deposition fluid drawn out of the head. The direction of priming is indicated by directional arrows 94.

Valve 74 is again actuated to move apparatus 10 into a rinsing position. The rinsing position allows optimal rinsing of dispensing surface 77 and nozzles 78. In this position optimal rinsing of the nozzles is realized. This means that dispensing surface 77 and top surface 15 (with insert 26 in place) of apparatus 10 are usually about 0.1 to about 3 mm apart, more usually, about 0.3 to about 0.1 mm apart. Rinsing the remaining deposition fluid drawn from the outside of the cleaned, primed head may be accomplished under conditions that effectively introduce and remove rinse fluid from the priming chamber, while drawing the least amount of additional deposition fluid from the head. Positive pressure is still to be avoided due to the possibility that rinse fluid could either enter the head and affect the deposition fluid or leak out of the prime chamber.

Pneumatic directional valve 59 is activated open. When the apparatus is in the rinsing position, on-off valve 46 remains open to provide fluid communication between a vacuum source and waste receptacle and proportional vacuum regulating valve 48, which is now set to a vacuum level appropriate for rinsing. Approximately simultaneously, pneumatic directional valve 66 and pressure regulator 68 are activated to force rinse fluid, which is now in receptacle 50, through lines 56 and 58 and up through wash fluid channels 22. Pneumatic directional valve 59 permits a predetermined flow rate of inert gas, which is ambient to a reaction chamber, to flow through line 62 and mix with the rinse fluid to form a vent gas/rinse fluid mixture. The rinse fluid, having mixed with inert gas, enters chamber 80 and impinges on dispensing surface 77 and nozzles 78 to rinse these surfaces. This rinsing procedure is continued for a period sufficient to achieve rinsing of the dispensing surface and the nozzles and remove deposition fluid drawn out during priming. Usually, the period of time for rinsing is about 0.1 to about 1 second. The temperature of the rinse fluid may be elevated to promote more efficient rinsing. The temperature is usually in the range of about 20 to about 40° C., more usually, about 20 to about 25° C. The nature of the rinse fluid is dependent on the nature of the wash fluid and of the reagents employed in the synthesis of the chemical compounds. The rinse fluid may be, for example, any of the solvents mentioned above for the wash fluid, and the like. Valves and 46 and 72 are again actuated to respectively shut off the vacuum and retract the primer as the cycle is completed.

Another embodiment of the present invention is an apparatus for synthesizing a plurality of biopolymer features on the surface of a substrate or support. The apparatus comprises a reaction chamber, a mechanism for moving a substrate to and from the reaction chamber, a controller for controlling the movement of the mechanism, a droplet dispensing device for dispensing reagents for synthesizing biopolymers on a surface of the substrate, a cleaning and priming station for cleaning and priming the dispensing device, the cleaning and priming station comprising an apparatus as described above, and a mechanism for moving the dispensing device and/or the cleaning and priming station relative to one another. Preferably, the elements of the above apparatus are under computer control.

The components of the synthesis apparatus are normally mounted on a suitable frame in a manner consistent with the present invention. The frame of the apparatus is generally constructed from a suitable material that gives structural strength to the apparatus so that various moving parts may be employed in conjunction with the apparatus. Such materials include, for example, metal, plastic, glass, lightweight composites, and the like.

The synthesis apparatus may also comprise a loading station for loading reagents into the dispensing device and a mechanism for moving the dispensing device and/or the loading station relative to one another. The apparatus further may comprise a mechanism for inspecting the reagent deposited on the surface of the substrate.

The substrate mount may be any convenient structure on which the substrate may be placed and held for depositing reagents on the surface on the substrate. The substrate mount may be of any size and shape and generally has a shape similar to that of the substrate, usually, as large as or slightly larger than the substrate, i.e., about 1 to about 10% larger than the substrate. For example, the substrate mount is rectangular for a rectangular substrate, circular for a circular substrate and so forth. The substrate mount may be constructed from any material of sufficient strength to physically receive and hold the substrate during the deposition of reagents on the substrate surface as well as to withstand the rigors of movement in one or more directions. Such materials include metal, plastic, composites, and the like. The support or substrate may be retained on the substrate mount by gravity, friction, vacuum, and the like.

The fluid dispensing device normally includes a reagent source or manifold as well as reagent lines that connect the source to fluid dispensing nozzles and the like. Any system may be employed that dispenses fluids such as water, aqueous media, organic solvents and the like as droplets of liquid. The fluid dispensing device may comprises a pump for moving fluid and may also comprise a valve assembly and a manifold as well as a means for delivering predetermined quantities of fluid to the surface of a substrate. The fluids may be dispensed by any of the known techniques such as those mentioned above. Any standard pumping technique for pumping fluids may be employed in the dispensing device. For example, pumping may be by means of a peristaltic pump, a pressurized fluid bed, a positive displacement pump, e.g., a syringe pump, and the like.

In one specific embodiment a droplet dispensing device comprises one or more heads. Each head carries hundreds of ejectors or nozzles to deposit droplets. In the case of heads, each ejector may be in the form of an electrical resistor operating as a heating element under control of a processor (although piezoelectric elements could be used instead). Each orifice with its associated ejector and a reservoir chamber, acts as a corresponding pulse-jet with the orifice acting as a nozzle. In this manner, application of a single electric pulse to an ejector causes a droplet to be dispensed from a corresponding orifice (or larger droplets could be deposited by using multiple pulses to deposit a series of smaller droplets at a given location).

As is well known in the art, the amount of fluid that is expelled in a single activation event of a pulse jet, can be controlled by changing one or more of a number of parameters, including the orifice diameter, the orifice length (thickness of the orifice member at the orifice), the size of the deposition chamber, and the size of the heating element, among others. The amount of fluid that is expelled during a single activation event is generally in the range about 0.1 to 1000 pL, usually about 0.5 to 500 pL and more usually about 1.0 to 250 pL. A typical velocity at which the fluid is expelled from the chamber is more than about 1 m/s, usually more than about 10 m/s, and may be as great as about 20 m/s or greater. As will be appreciated, if the orifice is in motion with respect to the receiving surface at the time an ejector is activated, the actual site of deposition of the material will not be the location that is at the moment of activation in a line-of-sight relation to the orifice, but will be a location that is predictable for the given distances and velocities.

Figure 11:
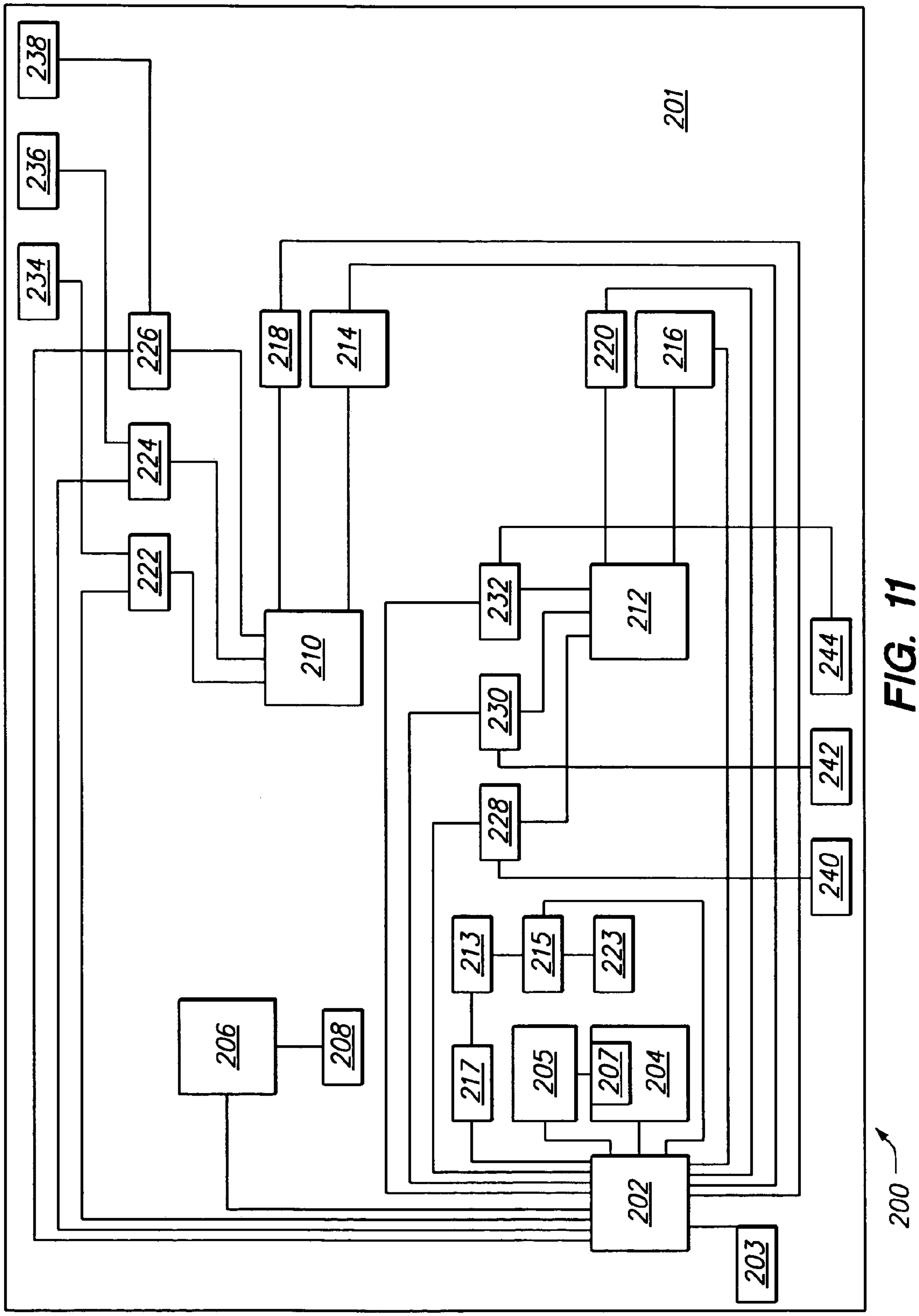
FIG. 11 is a schematic depiction of an apparatus for synthesizing a plurality of chemical compounds on the surface of a support or substrate, which includes the apparatus of FIG. 1.

One embodiment of an apparatus in accordance with the present invention is depicted in FIG. 11 in schematic form. Apparatus 200 comprises platform 201 on which the components of the apparatus are mounted. Apparatus 200 comprises main computer 202, with which various components of the apparatus are in communication. Video display 203 is in communication with computer 202. Apparatus 200 further comprises reaction chamber 204, which is controlled by main computer 202. The nature of reaction chamber 204 depends on the nature of the deposition technique employed to add monomers to a growing polymer chain. Such deposition techniques include, by way of illustration and not limitation, pulse-jet deposition, and so forth. Usually, reaction chamber 204 comprises a droplet dispensing device 207. Mechanism 205 is controlled by main computer 202 and moves a droplet dispensing device 207 in reaction chamber 204 into position for depositing, cleaning, priming and so forth. Transfer robot 206 is also controlled by main computer 202 and comprises a robot arm 208 that moves a support to and from reaction chamber 204. The support may be moved to one or more flow cells such as first flow cell 210 or second flow cell 212 for carrying out various procedures for synthesizing the biopolymers such as, for example, oxidation steps, blocking or deblocking steps and so forth. First flow cell 210 is in communication with program logic controller 214, which is controlled by main computer 202, and second flow cell 212 is in communication with program logic controller 216, which is also controlled by main computer 202. First flow cell 210 is in communication with flow sensor and level indicator 218, which is controlled by main computer 202, and second flow cell 212 is in communication with flow sensor and level indicator 220, which is also controlled by main computer 202. First flow cell 210 is in fluid communication with manifolds 222, 224 and 226, each of which is controlled by main computer 202 and each of which is in fluid communication with a source of fluid reagents, namely, 234, 236 and 238, respectively. Second flow cell 212 is in fluid communication with manifolds 228, 230 and 232, each of which is controlled by main computer 202 and each of which is in fluid communication with a source-of fluid reagents, namely, 240, 242 and 244, respectively. Apparatus 213, which is an apparatus similar to the apparatus described above, is in communication with program logic controller 217, which is controlled by main computer 202. Transfer robot 215 is also controlled by main computer 202 and comprises a robot arm 223 that moves apparatus 213 to and from reaction chamber 204.

As mentioned above, the apparatus and the methods in accordance with the present invention may be automated. To this end the apparatus of the invention further comprises appropriate motors and electrical and mechanical architecture and electrical connections, wiring and devices such as timers, clocks, computers and so forth for operating the various elements of the apparatus. Such architecture is familiar to those skilled in the art and will not be discussed in more detail herein.

To assist in the automation of the present process, the functions and methods may be carried out under computer control, that is, with the aid of a computer. For example, an IBM® compatible personal computer (PC) may be utilized. The computer is driven by software specific to the methods described herein. A preferred computer hardware capable of assisting in the operation of the methods in accordance with the present invention involves a system with at least the following specifications: Pentium® processor or better with a clock speed of at least 100 MHz, at least 32 megabytes of random access memory (RAM) and at least 80 megabytes of virtual memory, running under either the Windows 95 or Windows NT 4.0 operating system (or successor thereof).

Software that may be used to carry out the methods may be, for example, Microsoft Excel or Microsoft Access, suitably extended via user-written functions and templates, and linked when necessary to stand-alone programs that perform other functions. Examples of software or computer programs used in assisting in conducting the present methods may be written, preferably, in Visual BASIC, FOR- TRAN and $C^{++}$. It should be understood that the above computer information and the software used herein are by way of example and not limitation. The present methods may be adapted to other computers and software. Other languages that may be used include, for example, PASCAL, PERL or assembly language.

As indicated above, the present apparatus and methods may be employed in the preparation of substrates having a plurality of chemical compounds in the form of an array on the surface of such substrates. The chemical compounds may be deposited on the surface of the substrate as fully formed moieties. On the other hand, the chemical compounds may be synthesized in situ in a series of steps such as, for example, the addition of building blocks, which are chemical components of the chemical compound. Examples of such building blocks are those found in the synthesis of polymers. The invention has particular application to chemical compounds that are biopolymers such as polynucleotides, for example, oligonucleotides.

Preferred materials for the substrate itself are those that provide physical support for the chemical compounds that are deposited on the surface or synthesized on the surface in situ from subunits. The materials should be of such a composition that they endure the conditions of a deposition process and/or an in situ synthesis and of any subsequent treatment or handling or processing that may be encountered in the use of the particular array.

Typically, the substrate material is transparent. By "transparent" is meant that the substrate material permits signal from features on the surface of the substrate to pass therethrough without substantial attenuation and also permits any interrogating radiation to pass therethrough without substantial attenuation. By "without substantial attenuation" may include, for example; without a loss of more than 40% or more preferably without a loss of more than 30%, 20% or 10%, of signal. The interrogating radiation and signal may for example be visible, ultraviolet or infrared light. In certain embodiments, such as for example where production of binding pair arrays for use in research and related applications is desired, the materials from which the substrate may be fabricated should ideally exhibit a low level of non-specific binding during hybridization events.

The materials may be naturally occurring or synthetic or modified naturally occurring. Suitable rigid substrates may include glass, which term is used to include silica, and include, for example, glass such as glass available as Bioglass, and suitable plastics. Should a front array location be used, additional rigid, non-transparent materials may be considered, such as silicon, mirrored surfaces, laminates, ceramics, opaque plastics, such as, for example, polymers such as, e.g., poly (vinyl chloride), polyacrylamide, polyacrylate, polyethylene, polypropylene, poly(4-methylbutene), polystyrene, polymethacrylate, poly(ethylene terephthalate), nylon, poly(vinyl butyrate), etc., either used by themselves or in conjunction with other materials. The surface of the substrate is usually the outer portion of a substrate.

The surface of the material onto which the chemical compounds are deposited or formed may be smooth or substantially planar, or have irregularities, such as depressions or elevations. The surface may be modified with one or more different layers of compounds that serve to modify the properties of the surface in a desirable manner. Such modification layers, when present, will generally range in thickness from a monomolecular thickness to about 1 mm, usually from a monomolecular thickness to about 0.1 mm and more usually from a monomolecular thickness to about 0.001 mm. Modification layers of interest include: inorganic and organic layers such as metals, metal oxides, polymers, small organic molecules and the like. Polymeric layers of interest include layers of: peptides, proteins, polynucleic acids or mimetics thereof (for example, peptide nucleic acids and the like); polysaccharides, phospholipids, polyurethanes, polyesters, polycarbonates, polyureas, polyamides, polyethylene amines, polyarylene sulfides, polysiloxanes, polyimides, polyacetates, and the like, where the polymers may be hetero- or homo-polymeric, and may or may not have separate functional moieties attached thereto (for example, conjugated). Various further modifications to the particular embodiments described above are, of course, possible. Accordingly, the present invention is not limited to the particular embodiments described in detail above.

The material used for an array support or substrate may take any of a variety of configurations ranging from simple to complex. Usually, the material is relatively planar such as, for example, a slide. In many embodiments, the material is shaped generally as a rectangular solid. As mentioned above, multiple arrays of chemical compounds may be synthesized on a sheet, which is then diced, i.e., cut by breaking along score lines, into single array substrates.

Typically, the substrate has a length in the range about 5 mm to 100 cm, usually about 10 mm to 25 cm, more usually about 10 mm to 15 cm, and a width in the range about 4 mm to 25 cm, usually about 4 mm to 10 cm and more usually about 5 mm to 5 cm. The substrate may have a thickness of less than 1 cm, or even less than 5 mm, 2 mm, 1 mm, or in some embodiments even less than 0.5 mm or 0.2 mm. The thickness of the substrate is about 0.01 mm to 5.0 mm, usually from about 0.1 mm to 2 mm and more usually from about 0.2 to 1 mm. The substrate is usually cut into individual test pieces, which may be the size of a standard size microscope slide, usually about 3 inches in length and 1 inch in width.

The invention has particular application to substrates bearing oligomers or polymers. The oligomer or polymer is a chemical entity that contains a plurality of monomers. It is generally accepted that the term "oligomers" is used to refer to a species of polymers. The terms "oligomer" and "polymer" may be used interchangeably herein. Polymers usually comprise at least two monomers. Oligomers generally comprise about 6 to about 20,000 monomers, preferably, about 10 to about 10,000, more preferably about 15 to about 4,000 monomers. Examples of polymers include polydeoxyribonucleotides, polyribonucleotides, other polynucleotides that are C-glycosides of a purine or pyrimidine base, or other modified polynucleotides, polypeptides, polysaccharides, and other chemical entities that contain repeating units of like chemical structure. Exemplary of oligomers are oligonucleotides and peptides.

A monomer is a chemical entity that can be covalently linked to one or more other such entities to form an oligomer or polymer. Examples of monomers include nucleotides, amino acids, saccharides, peptoids, and the like and subunits comprising nucleotides, amino acids, saccharides, peptoids and the like. The subunits may comprise all of the same component such as, for example, all of the same nucleotide or amino acid, or the subunit may comprise different components such as, for example, different nucleotides or different amino acids. The subunits may comprise about 2 to about 2000, or about 5 to about 200, monomer units. In general, the monomers have first and second sites (e.g., C-termini and N-termini, or 5' and 3' sites) suitable for binding of other like monomers by means of standard chemical reactions (e.g., condensation, nucleophilic displacement of a leaving group, or the like), and a diverse element that distinguishes a particular monomer from a different monomer of the same type (e.g., an amino acid side chain, a nucleotide base, etc.). The initial substrate-bound, or support-bound, monomer is generally used as a building block in a multi-step synthesis procedure to form a complete ligand, such as in the synthesis of oligonucleotides, oligopeptides, oligosaccharides, etc. and the like.

A biomonomer references a single unit, which can be linked with the same or other biomonomers to form a biopolymer (for example, a single amino acid or nucleotide with two linking groups one or both of which may have removable protecting groups). A biomonomer fluid or biopolymer fluid reference a liquid containing either a biomonomer or biopolymer, respectively (typically in solution).

A biopolymer is a polymer of one or more types of repeating units. Biopolymers are typically found in biological systems and particularly include polysaccharides (such as carbohydrates), and peptides (which term is used to include polypeptides, and proteins whether or not attached to a polysaccharide) and polynucleotides as well as their analogs such as those compounds composed of or containing amino acid analogs or non-amino acid groups, or nucleotide analogs or non-nucleotide groups. This includes polynucleotides in which the conventional backbone has been replaced with a non-naturally occurring or synthetic backbone, and nucleic acids (or synthetic or naturally occurring analogs) in which one or more of the conventional bases has been replaced with a group (natural or synthetic) capable of participating in Watson-Crick type hydrogen bonding interactions.

Polynucleotides are compounds or compositions that are polymeric nucleotides or nucleic acid polymers. The polynucleotide may be a natural compound or a synthetic compound. Polynucleotides include oligonucleotides and are comprised of natural nucleotides such as ribonucleotides and deoxyribonucleotides and their derivatives although unnatural nucleotide mimetics such as 2'-modified nucleosides, peptide nucleic acids and oligomeric nucleoside phosphonates are also used. The polynucleotide can have from about 2 to 5,000,000 or more nucleotides. Usually, the oligonucleotides are at least about 2 nucleotides, usually, about 5 to about 100 nucleotides, more usually, about 10 to about 50 nucleotides, and may be about 15 to about 30 nucleotides, in length. Polynucleotides include single or multiple stranded configurations, where one or more of the strands may or may not be completely aligned with another.

A nucleotide refers to a sub-unit of a nucleic acid and has a phosphate group, a 5 carbon sugar and a nitrogen containing base, as well as functional analogs (whether synthetic or naturally occurring) of such sub-units which in the polymer form (as a polynucleotide) can hybridize with naturally occurring polynucleotides in a sequence specific manner analogous to that of two naturally occurring polynucleotides. For example, a "polynucleotide" includes DNA (including cDNA), RNA, oligonucleotides, and PNA and other polynucleotides as described in U.S. Pat. No. 5,948,902 and references cited therein (all of which are incorporated herein by reference), regardless of the source. An "oligonucleotide" generally refers to a nucleotide multimer of about 10 to 100 nucleotides in length, while a "polynucleotide" includes a nucleotide multimer having any number of nucleotides.

The nature of the support or substrate to which a plurality of chemical compounds is attached is discussed above. The substrate can be hydrophilic or capable of being rendered hydrophilic or it may be hydrophobic. The substrate is usually glass such as flat glass whose surface has been chemically activated for binding thereto or synthesis thereon, glass available as Bioglass and the like. The surface of a substrate is normally treated to create a primed or functionalized surface, that is, a surface that is able to support the attachment of a fully formed chemical compound or the synthetic steps involved in the production of the chemical compound on the surface of the substrate. Functionalization relates to modification of the surface of a substrate to provide a plurality of functional groups on the substrate surface. By the term "functionalized surface" is meant a substrate surface that has been modified so that a plurality of functional groups are present thereon usually at discrete sites on the surface. The manner of treatment is dependent on the nature of the chemical compound to be synthesized and on the nature of the substrate surface. In one approach a reactive hydrophilic site or reactive hydrophilic group is introduced onto the surface of the substrate. Such hydrophilic moieties can be used as the starting point in a synthetic organic process.

In one embodiment, the surface of the substrate, such as a glass substrate, is siliceous, i.e., the surface comprises silicon oxide groups, either present in the natural state, e.g., glass, silica, silicon with an oxide layer, etc., or introduced by techniques well known in the art. One technique for introducing siloxyl groups onto the surface involves reactive hydrophilic moieties on the surface. These moieties are typically epoxide groups, carboxyl groups, thiol groups, and/or substituted or unsubstituted amino groups as well as a functionality that may be used to introduce such a group such as, for example, an olefin that may be converted to a hydroxyl group by means well known in the art. One approach is disclosed in U.S. Pat. No. 5,474,796 (Brennan), the relevant portions of which are incorporated herein by reference. A siliceous surface may be used to form silyl linkages, i.e., linkages that involve silicon atoms. Usually, the silyl linkage involves a silicon-oxygen bond, a silicon-halogen bond, a silicon-nitrogen bond, or a silicon-carbon bond.

Another method for attachment is described in U.S. Pat. No. 6,219,674 (Fulcrand, et al.). A surface is employed that comprises a linking group consisting of a first portion comprising a hydrocarbon chain, optionally substituted, and a second portion comprising an alkylene oxide or an alkylene imine wherein the alkylene is optionally substituted. One end of the first portion is attached to the surface and one end of the second portion is attached to the other end of the first portion chain by means of an amine or an oxy functionality. The second portion terminates in an amine or a hydroxy functionality. The surface is reacted with the substance to be immobilized under conditions for attachment of the substance to the surface by means of the linking group.

Another method for attachment is described in U.S. Pat. No. 6,258,454 (Lefkowitz, et al.). A solid substrate having hydrophilic moieties on its surface is treated with a derivatizing composition containing a mixture of silanes. A first silane provides the desired reduction in surface energy, while the second silane enables functionalization with molecular moieties of interest, such as small molecules, initial monomers to be used in the solid phase synthesis of oligomers, or intact oligomers. Molecular moieties of interest may be attached through cleavable sites.

A procedure for the derivatization of a metal oxide surface uses an aminoalkyl silane derivative, e.g., trialkoxy 3-aminopropylsilane such as aminopropyltriethoxy silane (APS), 4-aminobutyltrimethoxysilane, 4-aminobutyltriethoxysilane, 2-aminoethyltriethoxysilane, and the like. APS reacts readily with the oxide and/or siloxyl groups on metal and silicon surfaces. APS provides primary amine groups that may be used to carry out the present methods. Such a derivatization procedure is described in EP 0 173 356 B1, the relevant portions of which are incorporated herein by reference. Other methods for treating the surface of a substrate will be suggested to those skilled in the art in view of the teaching herein.

The devices and methods of the present invention are particularly useful for the preparation of substrates with array areas with array assemblies of biopolymers. An array includes any one-, two- or three- dimensional arrangement of addressable regions bearing a particular biopolymer such as polynucleotides, associated with that region. An array is addressable in that it has multiple regions of different moieties, for example, different polynucleotide sequences, such that a region or feature or spot of the array at a particular predetermined location or address on the array can detect a particular target molecule or class of target molecules although a feature may incidentally detect non-target molecules of that feature.

An array assembly on the surface of a substrate refers to one or more arrays disposed along a surface of an individual substrate and separated by inter-array areas. Normally, the surface of the substrate opposite the surface with the arrays (opposing surface) does not carry any arrays. The arrays can be designed for testing against any type of sample, whether a trial sample, a reference sample, a combination of the foregoing, or a known mixture of components such as polynucleotides, proteins, polysaccharides and the like (in which case the arrays may be composed of features carrying unknown sequences to be evaluated). The surface of the substrate may carry at least one, two, four, or at least ten, arrays. Depending upon intended use, any or all of the arrays may be the same or different from one another and each may contain multiple spots or features of chemical compounds such as, e.g., biopolymers in the form of polynucleotides or other biopolymer. A typical array may contain more than ten, more than one hundred, more than one thousand or ten thousand features, or even more than one hundred thousand features, in an area of less than 20 $cm^2$ or even less than 10 $cm^2$. For example, features may have widths (that is, diameter, for a round spot) in the range from a 10 μm to 1.0 cm. In other embodiments each feature may have a width in the range of 1.0 μm to 1.0 mm, usually 5.0 μm to 500 μm, and more usually 10 μm to 200 μm. Non-round features may have area ranges equivalent to that of circular features with the foregoing width (diameter) ranges.

Any of a variety of geometries of arrays on a substrate may be used. As mentioned above, an individual substrate may contain a single array or multiple arrays. Features of the array may be arranged in rectilinear rows and columns. This is particularly attractive for single arrays on a substrate. When multiple arrays are present, such arrays can be arranged, for example, in a sequence of curvilinear rows across the substrate surface (for instance, a sequence of concentric circles or semi-circles of spots), and the like. Similarly, the pattern of features may be varied from the rectilinear rows and columns of spots to include, for example, a sequence of curvilinear rows across the substrate surface (for example, a sequence of concentric circles or semi-circles of spots), and the like. The configuration of the arrays and their features may be selected according to manufacturing, handling, and use considerations.

Each feature, or element, within the molecular array is defined to be a small, regularly shaped region of the surface of the substrate. The features are arranged in a predetermined manner. Each feature of an array usually carries a predetermined chemical compound or mixtures thereof. Each feature within the molecular array may contain a different molecular species, and the molecular species within a given feature may differ from the molecular species within the remaining features of the molecular array. Some or all of the features may be of different compositions. Each array may contain multiple spots or features and each array may be separated by spaces or areas. It will also be appreciated that there need not be any space separating arrays from one another. Interarray areas and interfeature areas are usually present but are not essential. As with the border areas discussed above, these interarray and interfeature areas do not carry any chemical compound such as polynucleotide (or other biopolymer of a type of which the features are composed). Interarray areas and interfeature areas typically will be present where arrays are formed by the conventional in situ process or by deposition of previously obtained moieties, as described above, by depositing for each feature at least one droplet of reagent such as from a pulse jet but may not be present when, for example, photolithographic array fabrication processes are used. It will be appreciated though, that the interarray areas and interfeature areas, when present, could be of various sizes and configurations.

The devices and methods of the present invention are particularly useful in the preparation of individual substrates with oligonucleotide arrays for determinations of polynucleotides. As explained briefly above, in the field of bioscience, arrays of oligonucleotide probes, fabricated or deposited on a surface of a substrate, are used to identify DNA sequences in cell matter. The arrays generally involve a surface containing a mosaic of different oligonucleotides or sample nucleic acid sequences or polynucleotides that are individually localized to discrete, known areas of the surface. In one approach, multiple identical arrays across a complete front surface of a single substrate or support are used.

As mentioned above, biopolymer arrays can be fabricated by depositing previously obtained biopolymers (such as from synthesis or natural sources) onto a substrate, or by in situ synthesis methods.

The in situ method for fabricating a polynucleotide array typically follows, at each of the multiple different addresses at which features are to be formed, the same conventional iterative sequence used in forming polynucleotides from nucleoside reagents on a substrate by means of known chemistry. This iterative sequence is as follows: (a) coupling a selected nucleoside through a phosphite linkage to a functionalized substrate in the first iteration, or a nucleoside bound to the substrate (i.e. the nucleoside-modified substrate) in subsequent iterations; (b) optionally, but preferably, blocking unreacted hydroxyl groups on the substrate bound nucleoside; (c) oxidizing the phosphite linkage of step (a) to form a phosphate linkage; and (d) removing the protecting group ("deprotection") from the now substrate bound nucleoside coupled in step (a), to generate a reactive site for the next cycle of these steps. The functionalized substrate (in the first cycle) or deprotected coupled nucleoside (in subsequent cycles) provides a substrate bound moiety with a linking group for forming the phosphite linkage with a next nucleoside to be coupled in step (a). A number of reagents involved in the above synthetic steps such as, for example, phosphoramidite reagents, are sensitive to moisture and anhydrous conditions and solvents are employed. Final deprotection of nucleoside bases can be accomplished using alkaline conditions such as ammonium hydroxide, in a known manner.

The foregoing chemistry of the synthesis of polynucleotides is described in detail, for example, in Caruthers, *Science* 230: 281–285, 1985; Itakura, et al., *Ann. Rev. Biochem.* 53: 323–356; Hunkapillar, et al., *Nature* 310: 105–110, 1984; and in "Synthesis of Oligonucleotide Derivatives in Design and Targeted Reaction of Oligonucleotide Derivatives", CRC Press, Boca Raton, Fla., pages 100 et seq., U.S. Pat. Nos. 4,458,066, 4,500,707, 5,153,319, and 5,869,643, EP 0294196, and elsewhere.

As mentioned above, various ways may be employed to produce an array of polynucleotides on the surface of a substrate such as a glass substrate. Such methods are known in the art. One in situ method employs pulse-jet technology to dispense the appropriate phosphoramidite reagents and other reagents onto individual sites on a surface of a substrate. Oligonucleotides are synthesized on a surface of a substrate in situ using phosphoramidite chemistry. Solutions containing nucleotide monomers and other reagents as necessary such as an activator, e.g., tetrazole, are applied to the surface of a substrate by means of thermal pulse-jet technology. Individual droplets of reagents are applied to reactive areas on the surface using, for example, a thermal pulse-jet type nozzle. The surface of the substrate may have an alkyl bromide trichlorosilane coating to which is attached polyethylene glycol to provide terminal hydroxyl groups. These hydroxyl groups provide for linking to a terminal primary amine group on a monomeric reagent. Excess of non-reacted chemical on the surface is washed away in a subsequent step. For example, see U.S. Pat. No. 5,700,637 and PCT WO 95/25116 and PCT application WO 89/10977.

Another approach for fabricating an array of biopolymers on a substrate using a biopolymer or biomonomer fluid and using a fluid dispensing head is described in U.S. Pat. No. 6,242,266 (Schleifer, et al.). The head has at least one jet that can dispense droplets onto a surface of a substrate. The jet includes a chamber with an orifice and an ejector, which, when activated, causes a droplet to be ejected from the orifice. Multiple droplets of the biopolymer or biomonomer fluid are dispensed from the head orifice so as to form an array of droplets on the surface of the substrate.

In another embodiment (U.S. Pat. No. 6,232,072) (Fisher) a method of, and apparatus for, fabricating a biopolymer array is disclosed. Droplets of fluid carrying the biopolymer or biomonomer are deposited onto a front side of a transparent substrate. Light is directed through the substrate from the front side, back through a substrate backside and a first set of deposited droplets on the first side to an image sensor.

An example of another method for chemical array fabrication is described in U.S. Pat. No. 6,180,351 (Cattell). The method includes receiving from a remote station information on a layout of the array and an associated first identifier. A local identifier is generated corresponding to the first identifier and associated array. The local identifier is shorter in length than the corresponding first identifier. The addressable array is fabricated on the substrate in accordance with the received layout information.

Substrates comprising polynucleotide arrays may be provided in a number of different formats. In one format, the array is provided as part of a package in which the array itself is disposed on a first side of a glass or other transparent substrate. This substrate is fixed (such as by adhesive) to a housing with the array facing the interior of a chamber formed between the substrate and housing. An inlet and outlet may be provided to introduce and remove sample and wash liquids to and from the chamber during use of the array. The entire package may then be inserted into a laser scanner, and the sample-exposed array may be read through a second side of the substrate.

In another format, the array is present on an unmounted glass or other transparent slide substrate. This array is then exposed to a sample optionally using a temporary housing to form a chamber with the array substrate. The substrate may then be placed in a laser scanner to read the exposed array.

In another format the substrate is mounted on a substrate holder and retained thereon in a mounted position without the array contacting the holder. The holder is then inserted into an array reader and the array read. In one aspect of the above approach, the moieties may be on at least a portion of a rear surface of a transparent substrate, which is opposite a first portion on the front surface. In this format the substrate, when in the mounted position, has the exposed array facing a backer member of the holder without the array contacting the holder. The backer member is preferably has a very low in intrinsic fluorescence or is located far enough from the array to render any such fluorescence insignificant. Optionally, the array may be read through the front side of the substrate. The reading, for example, may include directing a light beam through the substrate from the front side and onto the array on the rear side. A resulting signal is detected from the array, which has passed from the rear side through the substrate and out the substrate front side. The holder may further include front and rear clamp sets, which can be moved apart to receive the substrate between the sets. In this case, the substrate is retained in the mounted position by the clamp sets being urged (such as resiliently, for example by one or more springs) against portions of the front and rear surfaces, respectively. The clamp sets may, for example, be urged against the substrate front and rear surfaces of a mounted substrate at positions adjacent a periphery of that slide. Alternatively, the array may be read on the front side when the substrate is positioned in the holder with the array facing forward (that is, away from the holder).

Regardless of the specific format, the above substrates may be employed in various assays involving biopolymers. For example, following receipt by a user of an array made by an apparatus or method of the present invention, it will typically be exposed to a sample (for example, a fluorescent-labeled polynucleotide or protein containing sample) and the array is then read. Reading of the array may be accomplished by illuminating the array and reading the location and intensity of resulting fluorescence at each feature of the array. For example, a scanner may be used for this purpose where the scanner may be similar to, for example, the AGILENT MICROARRAY SCANNER available from Agilent Technologies Inc, Palo Alto, Calif. Other suitable apparatus and methods are described in U.S. patent application Ser. No. 09/846,125 "Reading Multi-Featured Arrays" by Dorsel, et al.; and Ser. No. 09/430,214 "Interrogating Multi-Featured Arrays" by Dorsel, et al. The relevant portions of these references are incorporated herein by reference. However, arrays may be read by methods or apparatus other than the foregoing, with other reading methods including other optical techniques (for example, detecting chemiluminescent or electroluminescent labels) or electrical techniques (where each feature is provided with an electrode to detect hybridization at that feature in a manner disclosed in U.S. Pat. No. 6,221,583 and elsewhere). Results from the reading may be raw results (such as fluorescence intensity readings for each feature in one or more color channels) or may be processed results such as obtained by rejecting a reading for a feature that is below a predetermined threshold and/or forming conclusions based on the pattern read from the array (such as whether or not a particular target sequence may have been present in the sample). The results of the reading (processed or not) may be forwarded (such as by communication) to a remote location if desired, and received there for further use (such as further processing).

When one item is indicated as being "remote" from another, this is referenced that the two items are at least in different buildings, and may be at least one mile, ten miles, or at least one hundred miles apart. "Communicating" information references transmitting the data representing that information as electrical signals over a suitable communication channel (for example, a private or public network). "Forwarding" an item refers to any means of getting that item from one location to the next, whether by physically transporting that item or otherwise (where that is possible) and includes, at least in the case of data, physically transporting a medium carrying the data or communicating the data.

All publications and patent applications cited in this specification are herein incorporated by reference as if each individual publication or patent application were specifically and individually indicated to be incorporated by reference.

Although the foregoing invention has been described in some detail by way of illustration and example for purposes of clarity of understanding, it will be readily apparent to those of ordinary skill in the art in light of the teachings of this invention that certain changes and modifications may be made thereto without departing from the spirit or scope of the appended claims. Furthermore, the foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description; they are not intended to be exhaustive or to limit the invention to the precise forms disclosed. Many modifications and variations are possible in view of the above teachings. The embodiments were chosen and described in order to explain the principles of the invention and its practical applications and to thereby enable others skilled in the art to utilize the invention.

What is claimed is:

1. A method for cleaning and priming a droplet dispensing device for dispensing a fluid reagent for synthesis, said dispensing device comprising a plurality of nozzles aligned in at least one row, said method comprising:
- (a) sealingly engaging a dispensing surface of said dispensing device comprising said nozzles to form a chamber adjacent said dispensing surface,
- (b) introducing a wash fluid into said chamber and removing said wash fluid from said chamber, and
- (c) applying a vacuum individually to at least a portion of the plurality of said nozzles within said chamber wherein the vacuum is sufficient to prime said portion of the plurality of said nozzles with the fluid reagent to be dispensed and wherein the vacuum is applied to said portion of the plurality of said nozzles by means of individual vacuum sources.

2. A method according to claim 1 wherein said wash fluid is removed from said chamber by applying a vacuum to said chamber.

3. A method according to claim 2 wherein said vacuum applied to said chamber to remove said wash fluid is applied from a central portion of said chamber.

4. A method according to claim 1 wherein said dispensing device comprises a plurality of nozzles aligned in two parallel rows having inner opposing sides and outer sides and said wash fluid is introduced from openings in said chamber on the outer sides of said rows.

5. A method according to claim 4 wherein said wash fluid is removed from said chamber by applying a vacuum to said chamber between said rows.

6. A method according to claim 1 further comprising subsequent to step (c) applying a vacuum to said chamber wherein said vacuum is sufficient to dry said nozzles and said dispensing surface.

7. A method according to claim 1 further comprising:
- (d) introducing a wash fluid into said chamber and removing said wash fluid from said chamber.

8. A method according to claim 7 further comprising subsequent to step (d) applying a vacuum to said chamber sufficient to dry said nozzles and said dispensing surface.

9. A method for cleaning and priming a droplet dispensing device to dispense a fluid reagent for synthesis of a biopolymer, said device comprising a plurality of nozzles aligned in at least one row, said method comprising:
- (a) sealingly engaging a dispensing surface of said droplet dispensing device comprising said nozzles to form a chamber below said dispensing surface,
- (b) introducing a wash fluid into said chamber and applying a vacuum to said chamber sufficient to remove said wash fluid from said chamber,
- (c) applying a vacuum simultaneously and individually to each of the plurality of said nozzles within said chamber wherein the vacuum is sufficient to prime said nozzles with the fluid reagent to be dispensed and wherein the vacuum is applied to said nozzles by means of individual vacuum sources,
- (d) introducing a rinse fluid into said chamber and applying a vacuum to said chamber sufficient to remove said rinse fluid from said chamber, and
- (g) drying said nozzles and said dispensing surface by applying a vacuum to said chamber sufficient to dry said nozzles and said dispensing surface.

10. A method according to claim 9 wherein said chamber is formed by moving said dispensing device to an apparatus comprising a centrally located vacuum source, a plurality of individual vacuum sources for priming the nozzles with the fluid reagent to be dispensed and an opening for introducing a wash fluid or a rinse fluid.

11. A method according to claim 10 wherein said opening functions as a vent.

12. A method according to claim 9 wherein said vacuum of step (b) and said wash fluid of step (c) are introduced in a direction that is substantially perpendicular to said dispensing surface.

13. A method according to claim 9 wherein said dispensing device comprises a plurality of nozzles aligned in two parallel rows having inner opposing sides and outer sides and said wash fluid is introduced from openings in said chamber on the outer sides of said rows.

14. A method according to claim 13 wherein said wash fluid is removed from said chamber by applying a vacuum to said chamber between said rows.

15. A method for cleaning and priming a droplet dispensing device for dispensing a fluid reagent for synthesizing a biopolymer, said dispensing device comprising a plurality of nozzles aligned in at least one row, said method comprising:
- (a) sealingly engaging a dispensing surface of said dispensing device comprising said nozzles to form a chamber below said dispensing surface,
- (b) introducing a wash fluid into said chamber in a direction that is substantially perpendicular to said dispensing surface of said chamber and removing said wash fluid from said chamber in a direction that is substantially perpendicular to said dispensing surface, and (c) applying a vacuum simultaneously and individually to at least a portion of the plurality of said nozzles wherein the vacuum is sufficient to prime said portion of the plurality of said nozzles with the fluid reagent to be dispensed and wherein the vacuum is applied to said portion of the plurality of said nozzles by means of individual vacuum sources.

16. A method according to claim 15 further comprising:

(d) introducing a wash fluid into said chamber from the periphery of said chamber and removing said wash fluid from a center of said chamber.

17. A method for cleaning and priming a droplet dispensing device for dispensing a fluid reagent for synthesizing a biopolymer, said device comprising a plurality of nozzles aligned in at least one row, said method comprising:

(a) sealingly engaging a dispensing surface of said droplet dispensing device comprising said nozzles to form a chamber below said dispensing surface, (b) introducing a wash fluid into said chamber from the periphery of said chamber and applying a vacuum to said chamber from approximately a center thereof wherein the intensity of said vacuum is sufficient to remove said wash fluid from said chamber, (c) applying a vacuum simultaneously and individually to each of the plurality of said nozzles wherein the vacuum is sufficient to prime said nozzles with the fluid reagent to be dispensed and wherein the vacuum is applied to said nozzles by means of individual vacuum sources, (d) introducing a rinse fluid into said chamber from the periphery of said chamber and applying a vacuum to said chamber from approximately a center thereof wherein the intensity of said vacuum is sufficient to remove said rinse fluid from said chamber, and (e) applying a vacuum to said chamber from approximately a center thereof wherein the intensity of said vacuum is sufficient to dry said nozzles and said dispensing surface.

* * * * *